J. T. GATHRIGHT.
RIDING SADDLE.

No. 182,433.   Patented Sept. 19, 1876.

WITNESSES:

INVENTOR:
Jno. T. Gathright
BY
ATTORNEYS.

UNITED STATES PATENT OFFICE.

JOHN T. GATHRIGHT, OF LOUISVILLE, KENTUCKY.

IMPROVEMENT IN RIDING-SADDLES.

Specification forming part of Letters Patent No. 182,433, dated September 19, 1876; application filed August 16, 1876.

*To all whom it may concern:*

Be it known that I, JOHN T. GATHRIGHT, of Louisville, in the county of Jefferson and State of Kentucky, have invented a new and useful Improvement in Saddles; and I do hereby declare the following to be a full, clear, and exact description of the same, reference being had to the accompanying drawings, forming part of this specification, in which—

Figure 1:
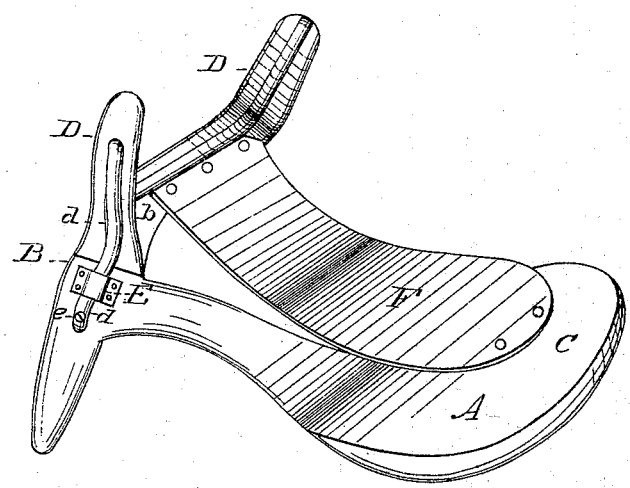
Figure 2:
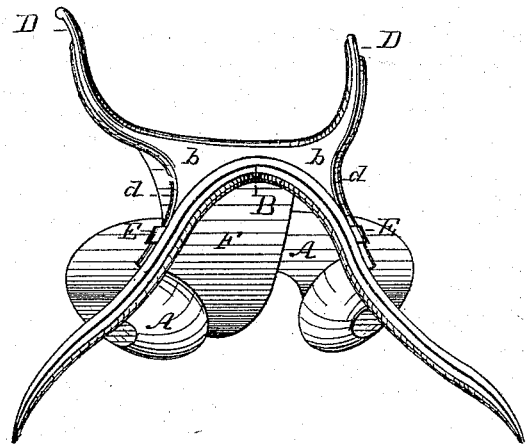

Figure 1 represents a perspective view of my invention. Fig. 2 is a front elevation of the same.

The object of this invention is to construct saddle-trees in such a manner that they may, as occasion requires, be used in making saddles either for ladies or gentlemen; or, a tree having been made into a gentleman's saddle, may quickly and readily be adapted for the use of a lady, by means of attachments hereinafter more fully described.

The invention consists, essentially, in providing the tree of a gentleman's saddle with attachments for horns and a supplementary seat, the former fitting over the pommel of the same, and being strengthened by the necessary re-enforcements. These attachments may be so constructed as to be used with any shape and style of gentleman's saddle.

In the accompanying drawings, A represents the tree of a gentleman's saddle of ordinary construction, consisting of the pommel B and cantle C. D D are the detachable horns, of usual shape, formed of wood or other suitable material, and attached to the tree by means of metallic strips $d\ d$, secured on each side to their outer surfaces, and passing through staples or metallic loops E E, fixed, at corresponding points on each side, to the saddle-tree.

The piece forming the horns is hollowed out so as to fit over the pommel B, thus leaving on its under surface the two downwardly-projecting points $b\ b$, between which the pommel rests, and the strips $d\ d$, which sit over these projections $b\ b$, may be held within the loops or staples E E by screw attachments $e\ e$ to the tree.

When desirable any other common method of attaching the horns to the tree may be used.

The supplementary seat F, which may be formed of any suitable material, is fixed in front between the horns to the piece composing them, and at the rear to the cantle C in any manner that may be preferred, its object being to make a seat suitable for, and conforming to, the position of a lady when riding, as it is used only when the saddle is converted into a side-saddle.

Having thus described my invention, what I claim as new, and desire to secure by Letters Patent, is—

1. The combination, with the tree of a gentleman's saddle, of usual construction, of the detachable horns D D, constructed and arranged substantially as shown and described, for the purpose specified.

2. The combination, with the tree of a gentleman's saddle, provided with horns over the pommel, of the supplementary detachable seat F, substantially as shown and described, for the purpose specified.

3. The combination, with the tree of a gentleman's saddle, of the usual construction, of the detachable horns D D, re-enforcing metallic strips $d\ d$, staples or metallic loops E E, screw attachments $e\ e$, and supplementary detachable seat F, all constructed and arranged substantially as shown and described, for the purpose specified.

JOHN T. GATHRIGHT.

Witnesses:
A. J. PULLIAM,
J. D. HUGHES.